United States Patent
Dobson et al.

(10) Patent No.: US 7,675,683 B2
(45) Date of Patent: Mar. 9, 2010

(54) AMBIENT LIGHT DISPLAY AND SYSTEM FOR DISPLAYING DATA

(75) Inventors: Dominic Dobson, Mercer Island, WA (US); David Andrew Weber, Snohomish, WA (US); David Joseph Perry, Woodinville, WA (US); John David Patton, Seattle, WA (US); Matthew A. Rhoades, Goleta, CA (US); Keith Bryant Payea, Santa Rosa, CA (US); Peter Purdy, Bend, OR (US)

(73) Assignee: Motion Research Corporation, Seattle, WA (US)

( * ) Notice: Subject to any disclaimer, the term of this patent is extended or adjusted under 35 U.S.C. 154(b) by 510 days.

(21) Appl. No.: 11/233,163

(22) Filed: Sep. 22, 2005

(65) Prior Publication Data

US 2006/0119540 A1 Jun. 8, 2006

Related U.S. Application Data

(60) Provisional application No. 60/641,564, filed on Jan. 4, 2005, provisional application No. 60/612,197, filed on Sep. 22, 2004.

(51) Int. Cl.
*G02B 27/14* (2006.01)
*G09G 5/00* (2006.01)
(52) U.S. Cl. .................. 359/630; 359/632; 345/8
(58) Field of Classification Search ......... 359/630–634; 345/7–9; 349/11
See application file for complete search history.

(56) References Cited

U.S. PATENT DOCUMENTS

| | | | |
|---|---|---|---|
| 3,966,303 A | 6/1976 | Yamamoto | |
| 4,453,327 A | 6/1984 | Clarke | |
| 5,601,078 A | 2/1997 | Schaller et al. | |
| 5,742,263 A | 4/1998 | Wang et al. | |
| 5,991,085 A * | 11/1999 | Rallison et al. | 359/630 |
| 6,008,946 A | 12/1999 | Knowles | |
| 6,483,483 B2 * | 11/2002 | Kosugi et al. | 345/8 |
| 6,937,400 B2 * | 8/2005 | Olsson | 359/630 |
| 6,970,130 B1 * | 11/2005 | Walters et al. | 342/357.06 |
| 7,145,726 B2 * | 12/2006 | Geist | 359/630 |
| 2002/0122015 A1 * | 9/2002 | Song et al. | 345/8 |
| 2002/0149545 A1 * | 10/2002 | Hanayama et al. | 345/7 |
| 2003/0058100 A1 | 3/2003 | Jumpertz | |

(Continued)

FOREIGN PATENT DOCUMENTS

| EP | 0807917 A2 | 11/1997 |
|---|---|---|
| EP | 0827377 A1 | 3/1998 |
| FR | 2265144 A1 | 3/1974 |

OTHER PUBLICATIONS

PCTUS2005033929 International Preliminary Report on Patentability, mailed Apr. 5, 2007.
PCTUS2005033929, International Search and Written Opinion, mailed Feb. 15, 2006.

*Primary Examiner*—Alicia M Harrington
(74) *Attorney, Agent, or Firm*—Lathrop & Gage LLP

(57) ABSTRACT

A system for displaying data includes a display unit and a transmitting unit. A display unit has a housing that defines an ambient light window and a viewing window. A data display is positioned inside the housing, and optics are included for guiding light from the ambient light window through the display and out the viewing window.

24 Claims, 9 Drawing Sheets

U.S. PATENT DOCUMENTS

2004/0008157 A1* 1/2004 Brubaker et al. ................ 345/8
2005/0180021 A1* 8/2005 Travers ....................... 359/630
2006/0052144 A1* 3/2006 Seil et al. .................. 455/575.1
2007/0058261 A1* 3/2007 Sugihara et al. ............. 359/630

* cited by examiner

AMBIENT LIGHT DISPLAY AND SYSTEM FOR DISPLAYING DATA

RELATED APPLICATIONS

The present application claims benefit of priority to provisional U.S. Patent Application No. 60/612,197, filed Sep. 22, 2004 and titled "System and Method for Displaying Field of View Information", and provisional U.S. Patent Application No. 60/641,564, filed Jan. 4, 2005 and titled "Attachable Universal Data Transmitter for Head Mounted Displays", each of which are incorporated herein by reference.

BACKGROUND

Prior art displays are often overwhelmed ("washed out") in high ambient light conditions and thus are not visible to a user. A common example of this is a laptop computer LCD display which utilizes a backlight to illuminate a LCD panel. This works effectively when the LCD backlight is brighter than the ambient light that shines on the LCD. However, due to packaging and battery life constraints, the typical laptop LCD backlight is not bright enough to overcome high levels of ambient light, such as direct sunlight, and the display becomes unreadable in these conditions. Further, prior art displays often require high capacity power sources to operate, and prior art mobile displays are often inconvenient to use, especially while performing a concurrent task.

Portable electronic devices such as electronic multimeters, mobile phones, portable music players, handheld GPS units, and others bring many conveniences to their users. However, a major disadvantage of such devices is that their displays (which provide data critical to their operation) typically reside solely on the device. This means that when the user wishes to read information off of the device, the user is required to physically move the device into the user's field of view. This requirement can be very inconvenient when the user is wearing the device (e.g., on a belt clip) or when the user has the device in a pocket. This requirement can also be very inconvenient and even dangerous when the user has his hands otherwise occupied and/or is simultaneously performing a task that is visually intensive (e.g., driving, cycling, inspecting, and performing construction or repair work). Enabling visual information from these pre-existing devices to be seen in a user's line of sight would increase both safety and convenience.

Head mounted displays have been devised to lessen the inconvenience related with some mobile displays; but head mounted displays are only available for a small range of devices and uses. Generally, prior art head mounted displays are one of two types: unwired battery powered head mounted displays (for maintenance work or entertainment, for example) and wired head mounted displays that do not rely on their own power sources (military-type displays that deliver information to pilots, for example). Both have important limitations associated with use in high ambient light conditions, including the "washing out" problem noted above.

In addition, prior art unwired battery powered head mounted displays require a significant amount of power to illuminate the displays, and thus must include powerful batteries. This requirement for power can significantly add to the display's cost, size, and weight, as larger and/or more expensive batteries are required or more powerful artificial light sources are used. Alternately, this power requirement can reduce the total operating time available to the user, which reduces the usefulness of the displays.

Prior art wired head mounted displays generally operate from larger power sources accessed through the wires and do not suffer the need for strict power conservation. However, they can still benefit from the use of smaller, less powerful artificial light sources or from the outright elimination of artificial light sources in order to reduce weight, size, cost, and/or power consumption.

SUMMARY

Display units and systems for displaying data are disclosed herein. A display unit of one embodiment includes a housing defining an ambient light window and a viewing window. A data display is positioned inside the housing, and optics are included for guiding light from the ambient light window through the display and out the viewing window.

In an embodiment, a system for displaying data is provided, including a display unit and a transmitting unit separate from the display unit. The display unit has a housing defining a viewing window, and a data display is positioned inside the housing and in electrical communication with a power source. A light source in electrical communication with the power source is positioned inside the housing where light emitted from the light source may pass through the display and out the viewing window. A first microcontroller is in electrical communication with the display for controlling an output of the display, and a receiver is in electrical communication with the first microcontroller for receiving signals broadcast from a remote position and transmitting the signals to the first microcontroller. The transmitting unit includes a transmitter in electrical communication with a second power source and a second microcontroller in electrical communication with the transmitter to transmit signals to the display unit receiver.

In an embodiment, a system for displaying data is provided, including a display unit and a transmitting unit separate from the display unit. The display unit has a housing defining an ambient light window and a viewing window, and a data display is positioned inside the housing. The display unit includes optics for guiding light from the ambient light window through the display and out the viewing window, and a first microcontroller is in electrical communication with the display for controlling an output of the display. A receiver is in electrical communication with the first microcontroller for receiving signals broadcast from a remote position and communicating the signals to the first microcontroller. The transmitting unit includes a transmitter in electrical communication with a second power source and a second microcontroller in electrical communication with the transmitter to transmit signals to the display unit receiver.

DETAILED DESCRIPTION

Figure 1:
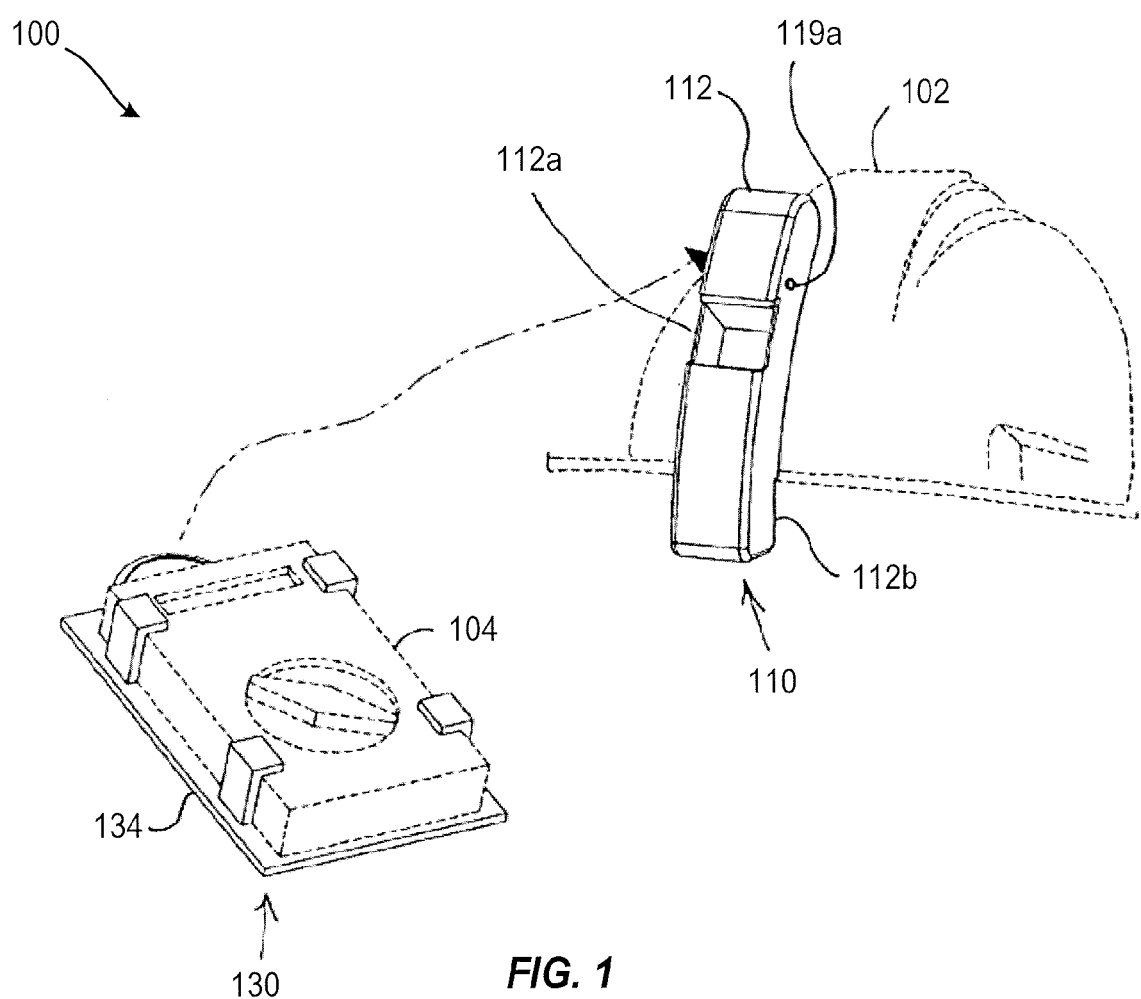
FIG. 1 shows a system for displaying data in accord with an embodiment.

FIG. 1 shows a system 100 for displaying data. The system 100 includes a display unit 110 (also referred to herein as an "ambient light display" 110) and a transmitting unit 130. Display unit 110 is shown attached to a helmet 102, and a user-supplied electronic device 104 is shown attached to transmitting unit 130.

Figure 2:
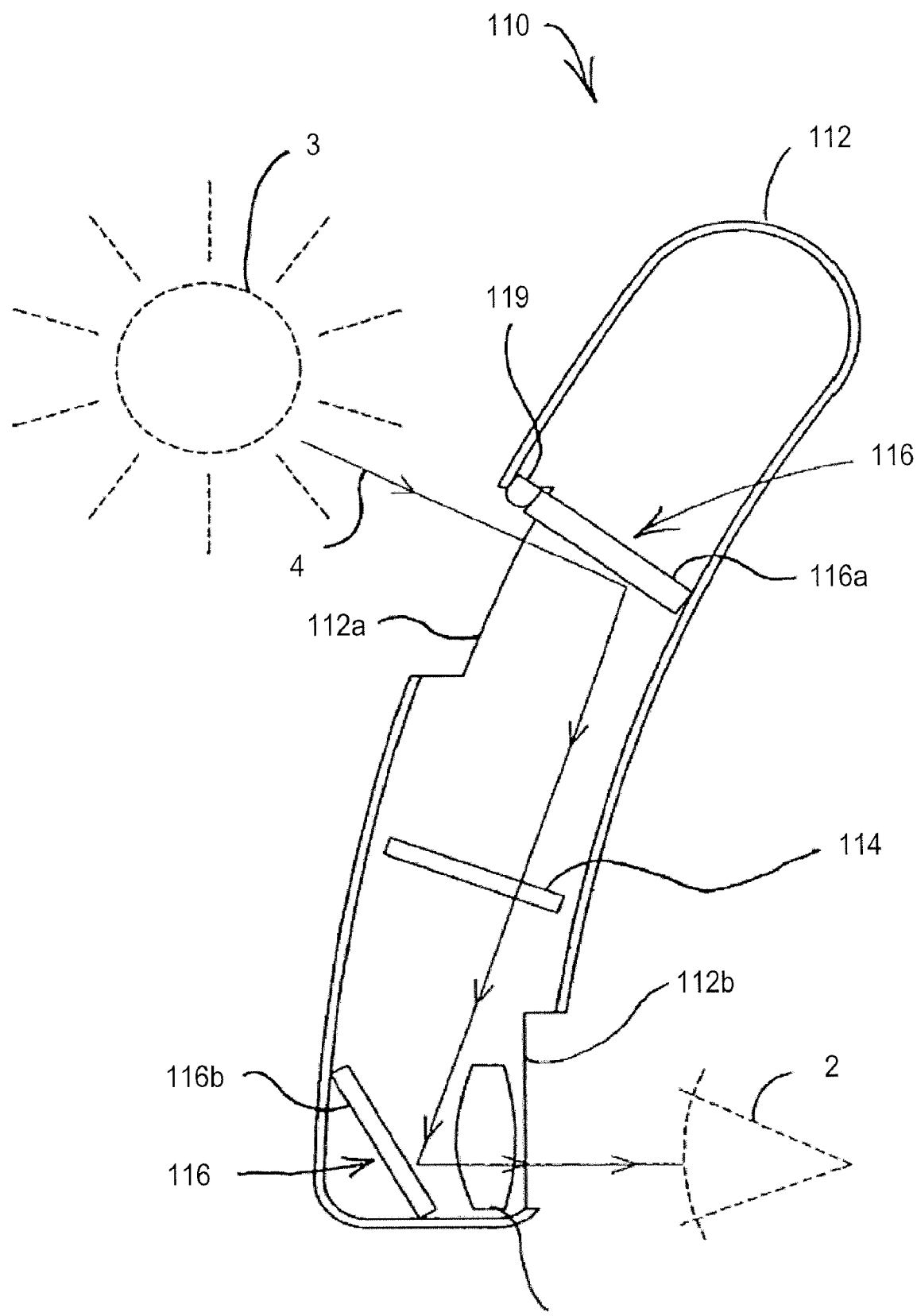
FIG. 2 shows a sectional view of the display unit of FIG. 1.

As shown in more detail in FIG. 2, display unit 110 has a housing 112 defining an ambient light window 112a and a viewing window 112b, a data display 114 positioned inside housing 112, and optics 116 for guiding light 4 from ambient light window 112a through display 114 and out of viewing window 112b. Optics 116 may for example include a first reflective member 116a adjacent ambient light window 112a and a second reflective member 116b adjacent viewing window 112b. Display 114 is for example positioned between first and second reflective members 116a, 116b. First and second reflective members 116a, 116b may have flat shapes, curved shapes, or spherical or aspheric curvatures to aid in guiding light 4. A lens 117 may be adjacent viewing window 112b for focusing or collimating light, and lens 117 may be positioned between display 114 and viewing window 112b to focus or collimate light 4 passing therethrough. Lens 117 may alternately be incorporated into viewing window 112b.

Figure 3:
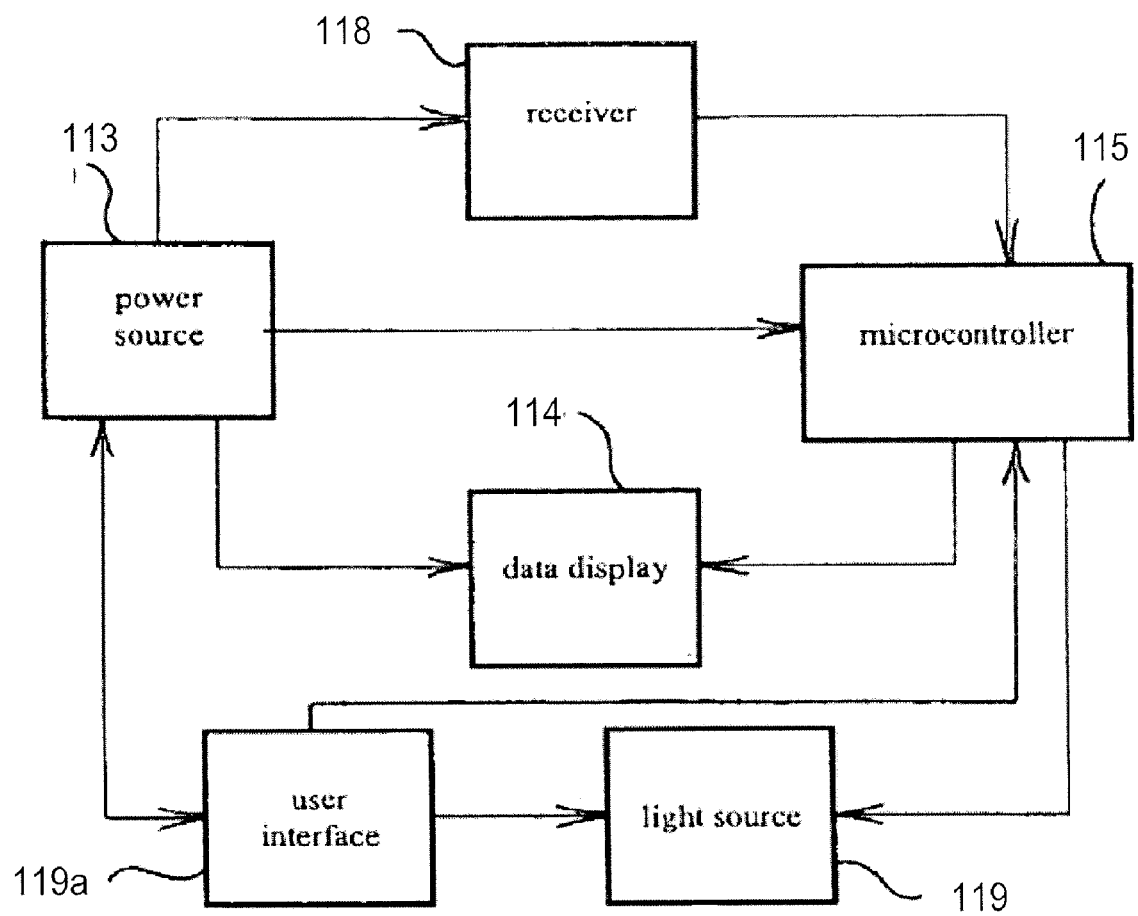
FIG. 3 shows a block diagram of the display unit of FIG. 1.

FIG. 3 shows display 114 in electrical communication with a power source 113 (e.g., a battery) and a microcontroller 115, to power and control, respectively, output at display 114. Power source 113 and microcontroller 115 may be located in housing 112; or one or both of power source 113 and microcontroller 115 are alternatively outside housing 112 and connected to display 114 by wiring.

Figure 4:
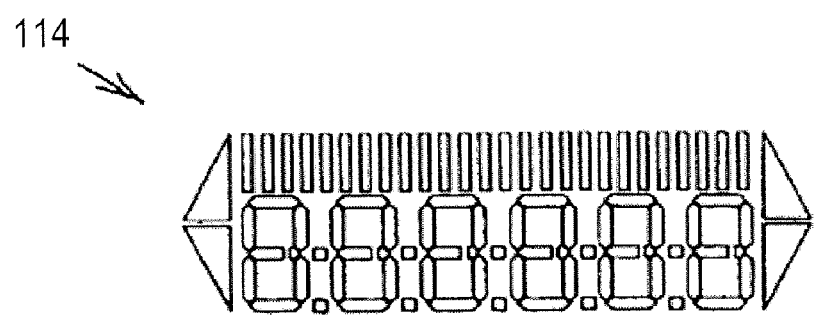
FIG. 4 shows a data display, according to an embodiment.

In one embodiment, a receiver 118 is in electrical communication with microcontroller 115; it receives signals broadcast to it from a remote position and then communicates those signals to microcontroller 115. Display 114 may be an alphanumeric LCD display, as shown in FIG. 4, or another type of display (e.g., diode-based display). Display 114 may selectively define letters, numbers, icons, arrows, enunciators, graphs, charts, and/or other indicia.

A light source 119 may be positioned within housing 112 such that light emitted from light source 119 passes through display 114 and out through viewing window 112b (See, e.g., FIGS. 2-7). Light source 119 may be in electrical communication with power source 113, as shown in FIG. 3, or it may connect with or have another power source. Light source 119 may be selectively activatable (a user interface 119a, e.g., a button, may allow the user to activate light source 119 as desired) or light source 119 may be automatically activatable (e.g., a sensor may activate light source 119 in low light situations). User interface 119a may also selectively regulate an amount of light produced by light source 119.

Figure 5:
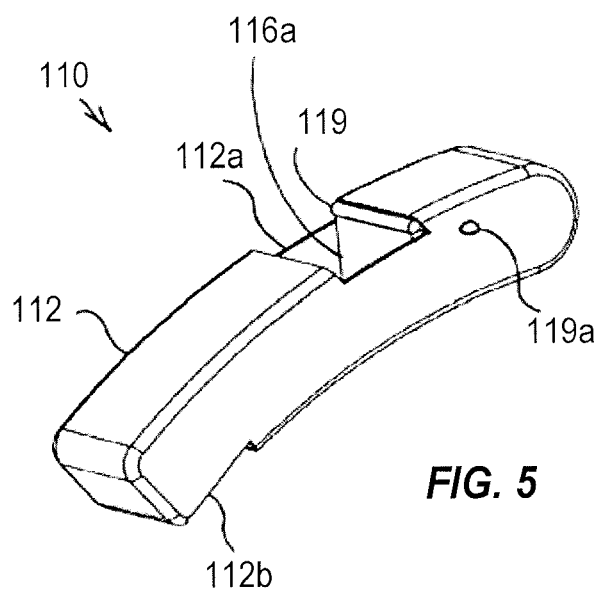
FIG. 5 shows a display unit, according to an embodiment.

Housing 112 may be fixedly or removably attached to helmet 102 in order to position viewing window 112b in a user's line of sight. An articulated bracket may be used to attach housing 112 to helmet 102 (e.g., a bracket similar to one used for military night vision goggles); but such articulated mounts have many parts that (a) add weight, expense, damage susceptibility and (b) reduce performance from dirt, debris, and rough handling. Housing 112 may be used with an articulated bracket as shown in FIG. 5. Alternately, housing 112 may be removably coupled to helmet 102 by a ratchet clip 120 (see FIG. 6 and FIG. 7) such that display unit 110 may be moved relative to helmet 102. Ratchet clip 120 may allow housing 112 to be released from helmet 102; it may further facilitate detachment during an impact event to helmet 102. Other non-ratcheting clips may also be used.

Figure 6:
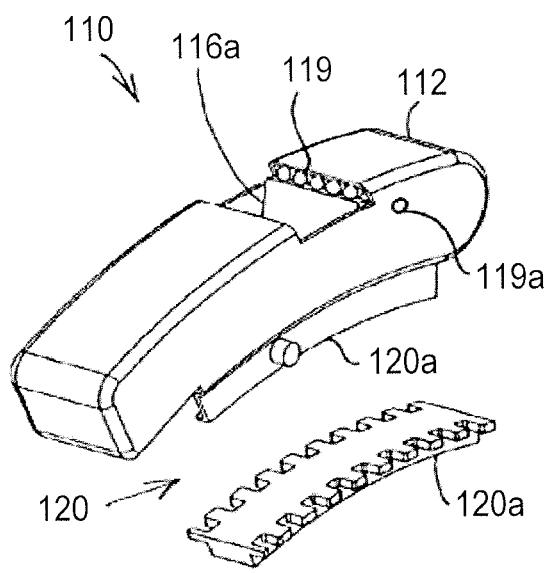
FIG. 6 shows a display unit having a linear ratchet clip, according to an embodiment.
Figure 7:
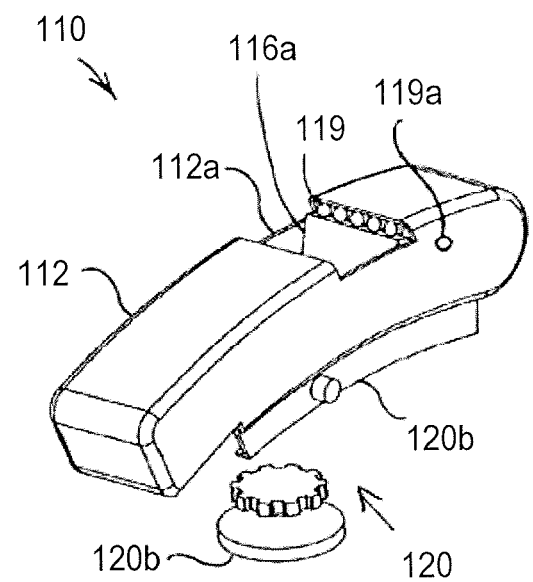
FIG. 7 shows a display unit having a rotational ratchet clip, according to an embodiment.

Illustratively, therefore, FIG. 6 shows an embodiment of display unit 110 using a linear ratchet clip 120a; and FIG. 7 shows an embodiment of display unit 110 with a rotational ratchet clip 120b.

Figure 8:
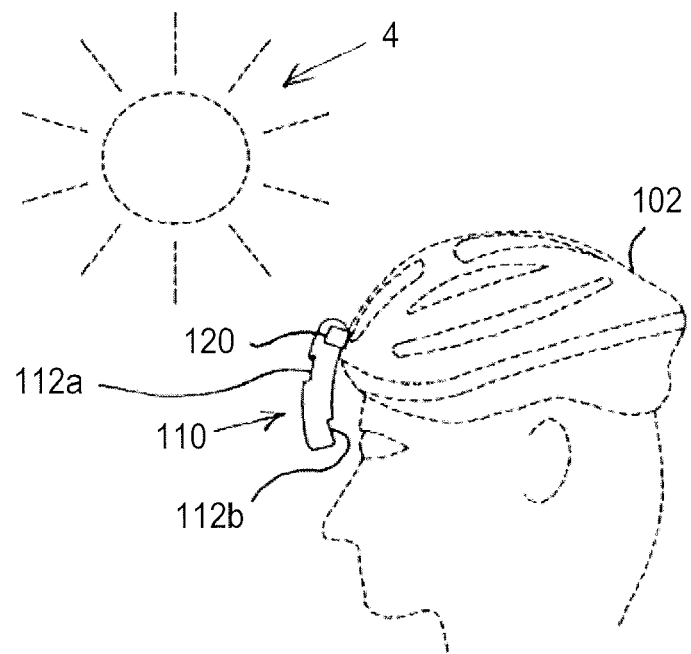
FIG. 8 shows the display unit of FIG. 1 in a first position.
Figure 9:
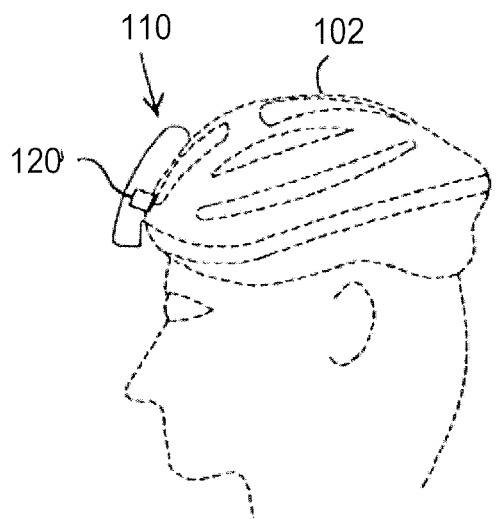
FIG. 9 shows the display unit of FIG. 6 in a second position.
Figure 10:
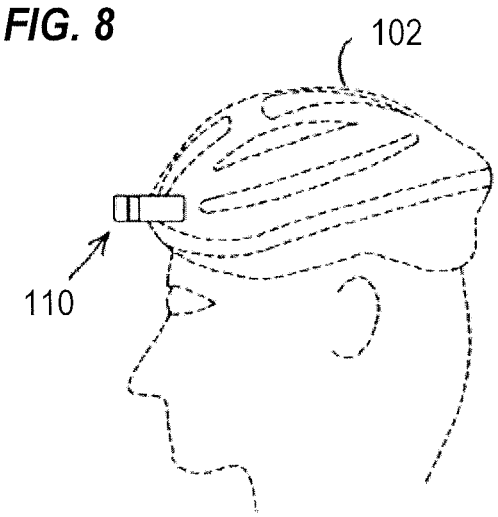
FIG. 10 shows the display unit of FIG. 7 in a second position.

Ratchet clip 120a allows the user to slide display unit 110 in relation to helmet 102 as seen by comparing FIG. 8 and FIG. 9; ratchet clip 120b may allow the user to rotate the display unit 110 in relation to helmet 102 as seen by comparing FIG. 8 and FIG. 10. By being able to move display unit 110 relative to helmet 102, the user may adjust the position of display unit 110 to fit his individual preference, or the user may move display unit 110 completely out of his line of sight in times of non-use. Housing 112 may thus have a curved configuration to allow viewing window 112b to sit above the user's eye without sticking out and upward from the user's head. In other words, such a curved configuration of housing 112 allows housing 112 to follow the curvature of the human skull and yet still permit placement of viewing window 112b in the user's periphery.

Figure 11:
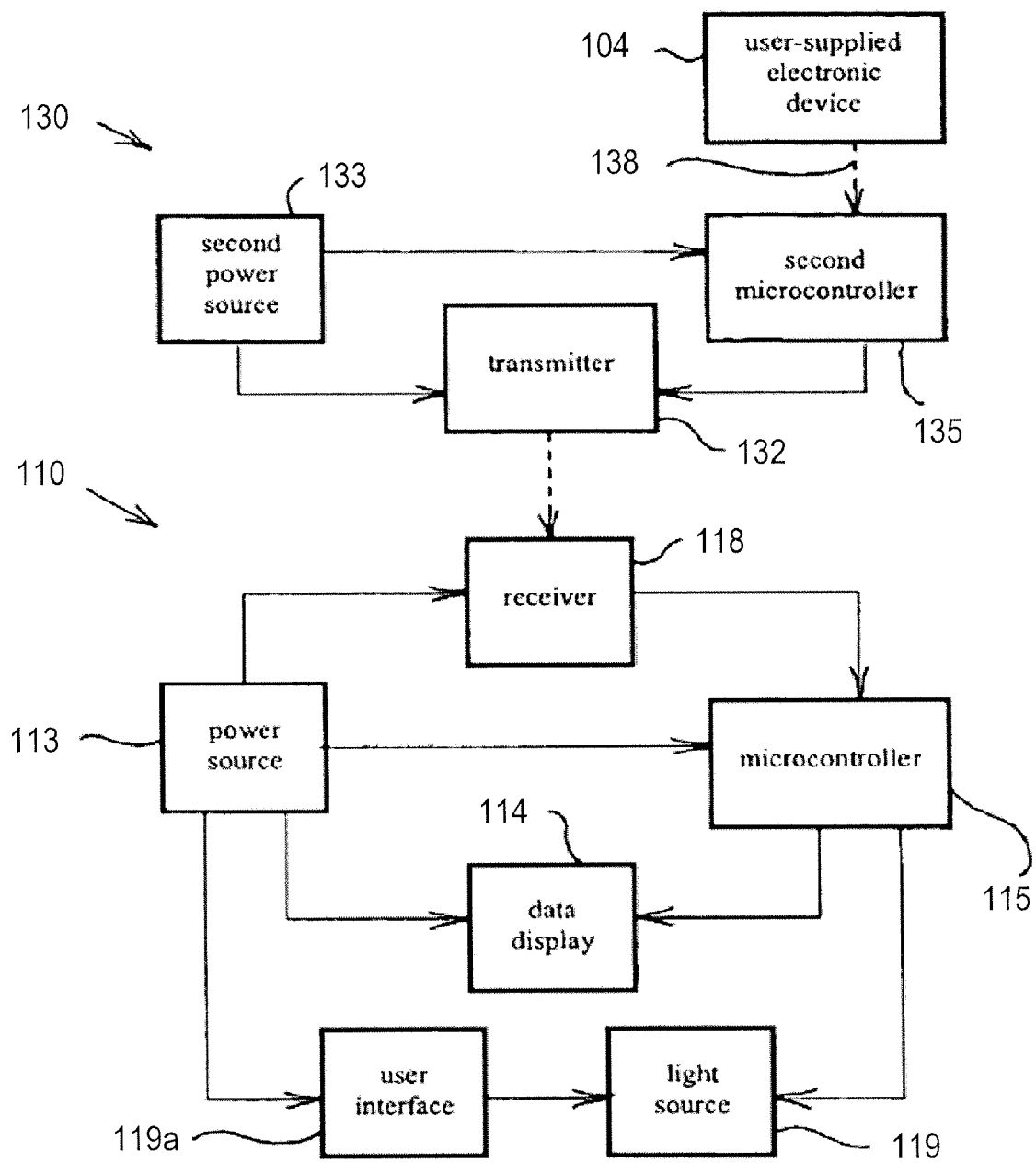
FIG. 11 shows a block diagram of the system of FIG. 1 in use with a user-supplied electronic device.

Transmitting unit 130 is separate from display unit 110 (FIG. 1) and may be in communication with display unit 110 through wired or wireless methods. As shown in the embodiment of FIG. 11, transmitting unit 130 includes a transmitter 132 powered by a second power source 133 (e.g., a battery) and in communication with a second microcontroller 135, so that transmitter 132 transmits signals to display unit receiver 118. As shown in FIG. 11, a link 138 (e.g., a wire) may be used to communicate between second microcontroller 135 and user-supplied electronic device 104. Link 138 for example interacts with a standard communication interface on user-supplied electronic device 104, such as a USB port, a serial port, etc.; it may comprise an RS-232 link. Second microcontroller 135 may alternately be in communication with electronic device 104 through wireless methods, e.g., infrared or radio communication.

Figure 12:
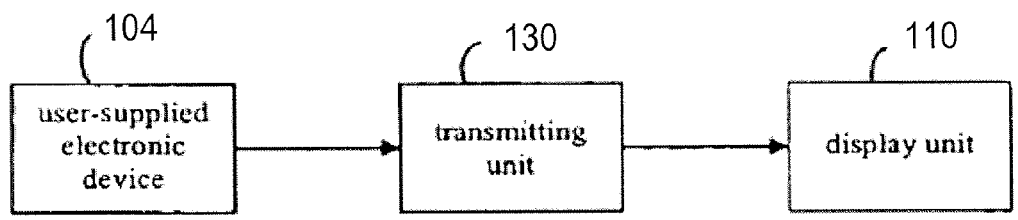
FIG. 12 illustrates information flow for the system of FIG. 1 in use with a user-supplied electronic device.

FIG. 12 thus illustrates information flow from user-supplied electronic device 104 to transmitting unit 130 to display unit 110.

Figure 13:
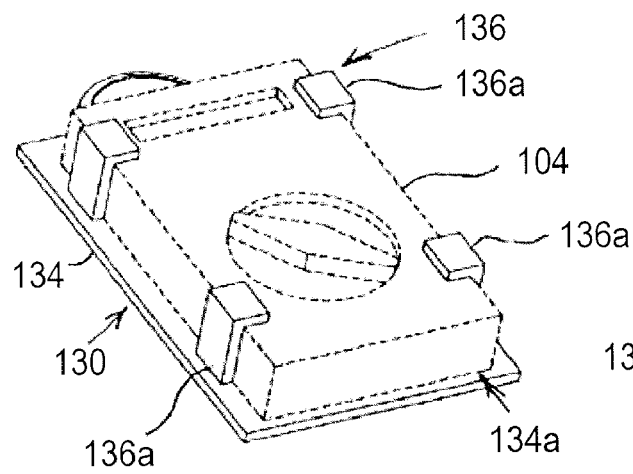
FIG. 13 shows the transmitting unit of FIG. 1 in use with a multimeter.
Figure 14:
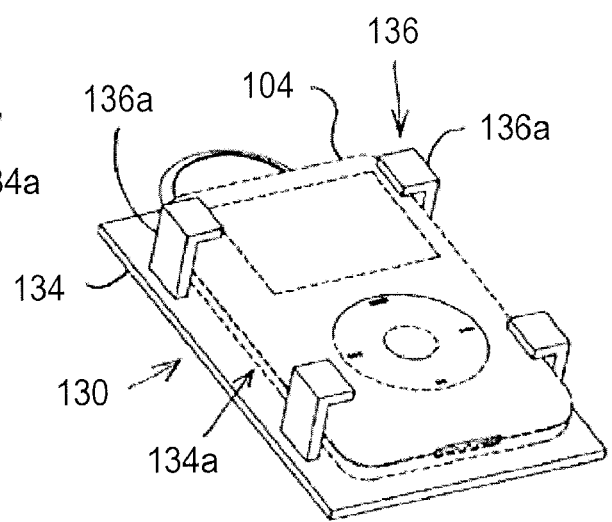
FIG. 14 shows the transmitting unit of FIG. 1 in use with a music player.
Figure 15:
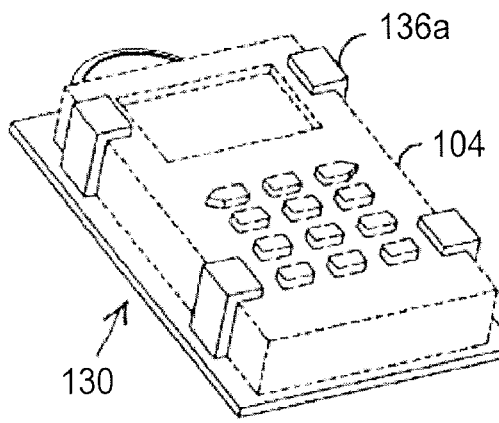
FIG. 15 shows the transmitting unit of FIG. 1 in use with a calculator.

FIGS. 13-15 show transmitting unit 130 with a cradle 134. Cradle 134 has a first area 134a that receives user-supplied electronic device 104 and a coupler 136 that secures electronic device 104 to cradle first area 134a. Coupler 136 may include a plurality of oppositely-disposed walls 136a, though other structure may be used such as: a strap, a clip, an adhesive, a hook and loop fastening system, a pouch. Electronic device 104 may be any of a wide range of devices that include display information, such as (but not limited to): an altimeter, a calculator (FIG. 15), a clock, an environmental sensor, a financial monitor, a fuel sensor, a GPS device, a medical sensor, a mobile telephone, a multimeter (FIG. 13), an odometer, a pager, a pedometer, a portable music player (FIG. 14), a pressure gauge, a radar gun, a radar gun detector, a radiation detector, a rangefinder, a scale, a speedometer, a thermometer, a timer, a tripmeter, a quantity sensor, a videogame player, an airborne gas measurement sensor, a depth finder, an anemometer, a satellite telephone, a handheld email device, a personal digital assistant, a laptop computer.

Figure 16:
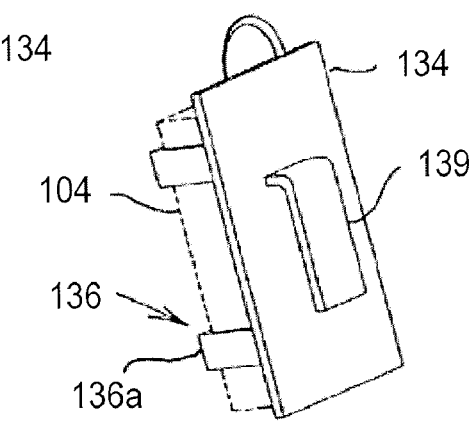
FIG. 16 shows a rear view of the transmitting unit of FIG. 1.

As shown in FIG. 16, transmitting unit 130 may include a clip 139 attached to cradle 134 to allow transmitting unit 130 to be attached to a wearer. Clip 139 may be a traditional belt clip, a ratchet clip, or any appropriate fastener.

Figure 20:
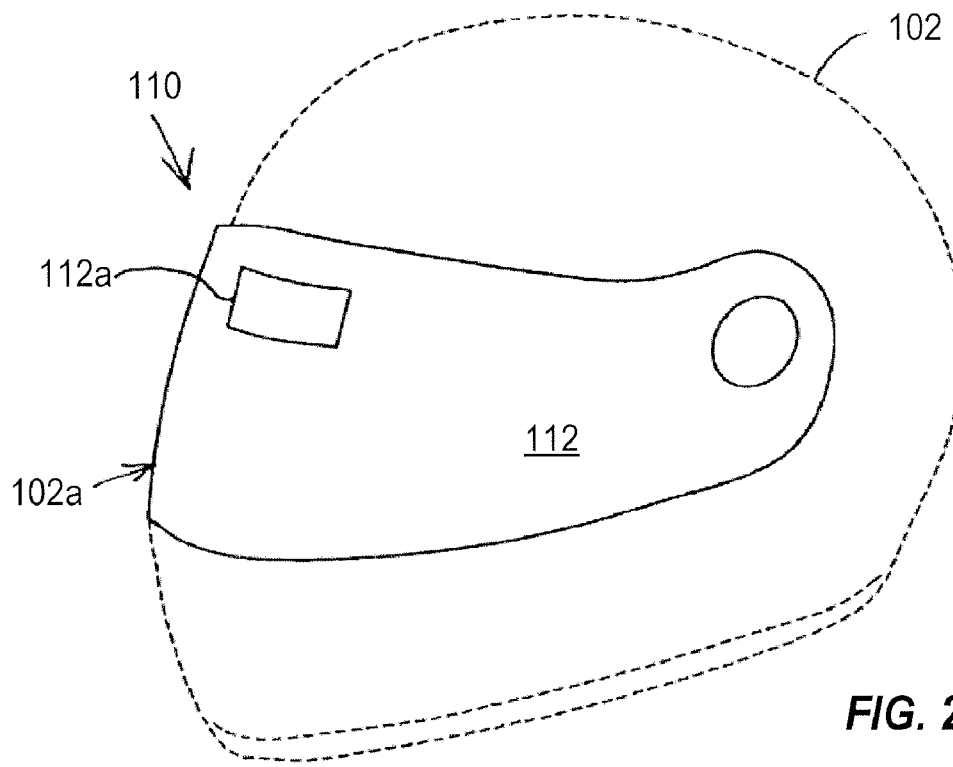
FIG. 20 shows a display unit, according to an embodiment, having a housing incorporated into a helmet visor.
Figure 19:
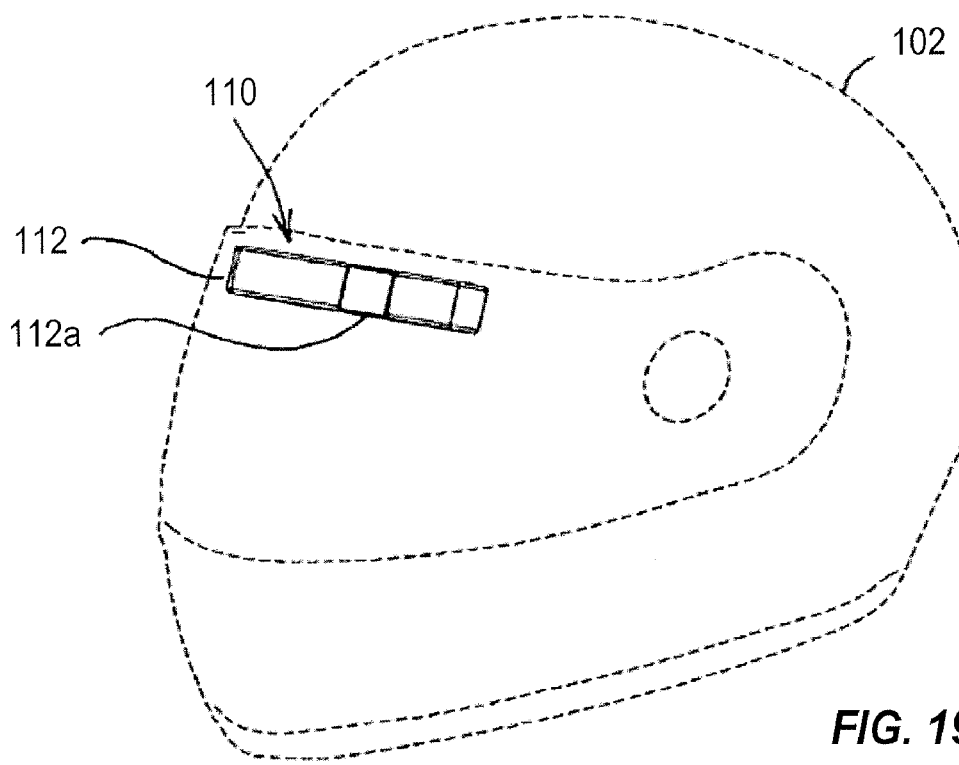
FIG. 19 shows a display unit, according to an embodiment, attached to a helmet visor.

As shown in FIGS. 19 and 20, housing 112 may be operatively attached to or built into a helmet visor 102a, respectively. Helmet visor 102a may flip-up similar to a "flip-up" motorcycle helmet or may be otherwise movable.

Figure 17:
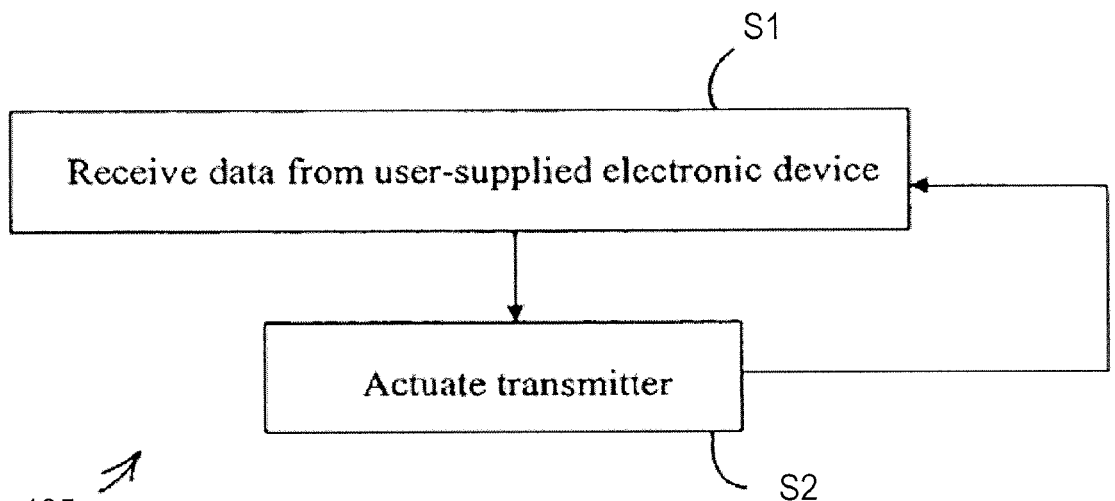
FIG. 17 shows a flowchart illustrating a process followed by a second microcontroller, according to an embodiment.

In an example of operation, a user attaches electronic device 104 to cradle first area 134a of transmitting unit 130 using coupler 136 and connects electronic device 104 to second microcontroller 135 via link 138. Display unit 110 may connect to helmet 102 as described above. The flowchart shown in FIG. 17 depicts a process 135a followed by second microcontroller 135. At step S1, second microcontroller 135 receives data from electronic device 104. Process 135a then continues to step S2, where second microcontroller 135 actuates transmitter 132 by providing data to transmitter 132. The process then repeats to step S1. Transmitter 132 transmits the data received from electronic device 104 to display unit receiver 118 when actuated.

Figure 18:
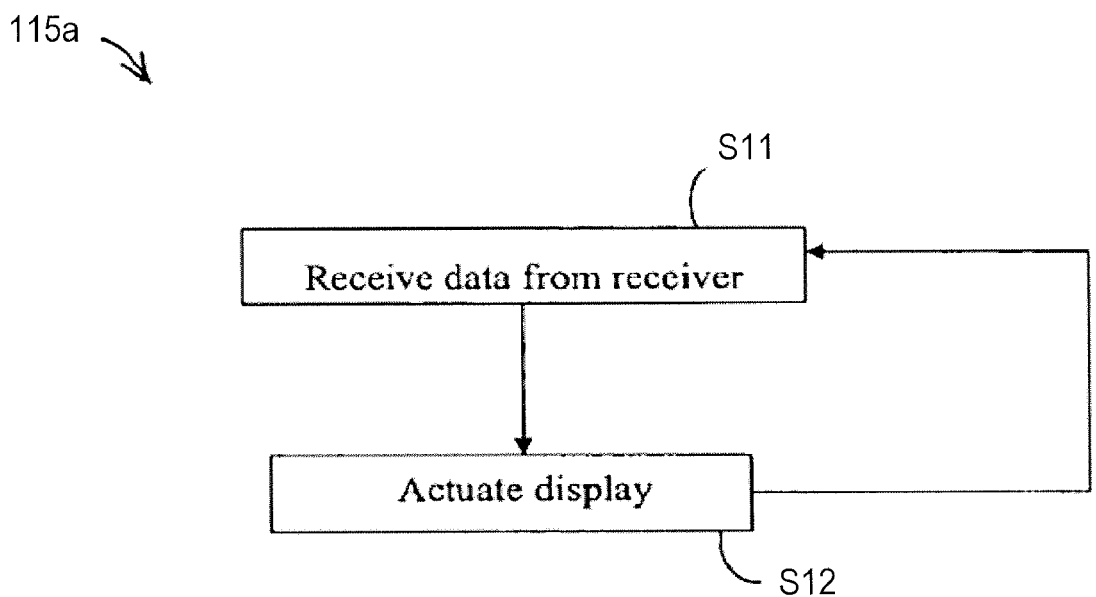
FIG. 18 shows a flowchart illustrating a process followed by a first nicrocontroller, according to an embodiment.

The flowchart shown in FIG. 18 depicts a process 115a followed by first microcontroller 115. At step S11, first microcontroller 115 receives data from receiver 118 that was obtained from transmitter 132. Process 115a then continues to step S12, where first microcontroller 115 actuates data display 114 by providing data received from receiver 118 to display 114. The process then repeats to step S11. Display 114 outputs data received from first microcontroller 115 when actuated.

Referring again to FIG. 2, ambient light 4 enters ambient light window 112a and is guided through display 114 and ultimately through viewing window 112b by optics 116. More specifically, ambient light 4 enters the display unit 110 via ambient light window 112a. Light source 119 offers artificial light when sufficient ambient light 4 is not available; it may be activated selectively by the user, or it may be automatically activated as described above. Ambient light 4 then hits first reflective member 116a, which may be flat, curved, spherical, or aspheric, and then continues through housing 112. Ambient light 4 passes through data display 114 that displays the information received from transmitter 132 and then reaches second reflective member 116b, which may also be flat, curved, spherical, or aspheric. Light 4 then passes through lens 117, where it may be focused or collimated, and exits housing 112 through viewing window 112b.

Light 4 passing through display 114 "backlights" display 114, and a user's eye 2 may thus perceive the image produced by display 114 by looking through viewing window 112b. An advantage of this design may be that display 114 is never overwhelmed ("washed out") in even the brightest of ambient light conditions. By allowing ambient light to pass through display 114 (rather than by relying on an artificial illumination source with brightness that is limited by size and/or cost and/or battery life, as in the prior art) available ambient light serves to backlight display 114 such that the more ambient light is available, the more light passes through housing 112 to light display 114, maintaining visibility of display 114 even in very high ambient light conditions. Accordingly, light source 119 (if within unit 110) need only illuminate display 114 in low light conditions. Although display unit 110 is illustrated in FIG. 2 as being exposed directly to a light source 3, it is appreciated that only a portion of display unit 110 may be exposed. or display unit 110 may be indirectly exposed to light source 3.

By using system 100, a head mounted display and all of its associated advantages may be used with a range of portable electronic devices 104, such that a user may read information from such portable electronic devices without actually having to have portable electronic device 104 in his/her direct field of view. For example, by using system 100, a repair person working on electronics may now, while using an existing multimeter 104, keep multimeter 104 on his belt or in a pocket and yet still read data from multimeter 104 (even while keeping his hands free, i.e., while not holding multimeter 104). Similarly, system 100 enables a mobile phone user or a portable music player user to use an existing mobile phone 104 or portable music player 104 but yet enjoy the benefits of a line of sight display. For example, the user of mobile phone 104 may see information such as caller ID or last number dialed without having to pick up his phone. Similarly, a user of portable music player 104, while using an existing player, may see information such as music title, track number, and time remaining without having to pick up portable music player 104. Using system 100, one may further see information such as location, direction, distance, heading, altitude, and speed in their line of sight by using system 100 and an existing GPS unit 104. These are only a few illustrative uses of system 100 and are not limiting.

Those skilled in the art appreciate that variations from the specified embodiments disclosed above are contemplated herein. The description should not be restricted to the above embodiments, but should be measured by the following claims.

What is claimed is:

1. A system for displaying data, comprising:
   a display unit, comprising:
      a housing defining an ambient light window and a viewing window;
      a data display positioned inside the housing;
      optics for guiding light from the ambient light window through the data display and out the viewing window, wherein the data display is illuminated by the light for viewing through the viewing window;
      a first microcontroller in electrical communication with the data display for controlling an output of the data display; and
      a receiver in electrical communication with the first microcontroller for receiving signals broadcast from a remote position and for communicating the signals to the first microcontroller; and
   a transmitting unit separate from the display unit, the transmitting unit comprising:
      a transmitter in electrical communication with a second power source; and
      a second microcontroller in electrical communication with the transmitter to transmit signals to the display unit receiver;
   wherein the housing is at least one of slidably and rotatably coupled to an article of headwear for movement between first and second positions relative to the article of headwear;

wherein the data display is viewable through the viewing window when the housing is at the first position; and wherein the data display is not viewable through the viewing window when the housing is at the second position.

2. The system as in claim 1, wherein the transmitting unit includes a link for communicating between the second microcontroller and a user-supplied electronic device.

3. The system as in claim 1, further comprising a light source positioned with the housing wherein light emitted from the light source may pass through the data display and out the viewing window, the light source being selectively activatable.

4. The system as in claim 1, further comprising a light source positioned with the housing wherein light emitted from the light source may pass through the data display and out the viewing window, the light source being automatically activatable.

5. The system as in claim 4, wherein a sensor may activate the light source in low ambient light conditions.

6. The system as in claim 1, wherein the transmitting unit further comprises:

a cradle having a first area for receiving a user-supplied electronic device; and a coupler for securing the user-supplied electronic device to the cradle first area.

7. The system as in claim 6, wherein the second microcontroller is in wireless communication with the user-supplied electronic device.

8. The system as in claim 7, wherein the user-supplied electronic device is selected from the group consisting of an altimeter, a calculator, a clock, an environmental sensor, a financial monitor, a fuel sensor, a GPS device, a medical sensor, a mobile telephone, a multimeter, an odometer, a pager, a pedometer, a portable music player, a pressure gauge, a radar gun, a radar gun detector, a radiation detector, a rangefinder, a scale, a speedometer, a thermometer, a timer, a tripmeter, a quantity sensor, a videogame player, an airborne gas measurement sensor, a depth finder, an anemometer, a satellite telephone, a handheld email device, a personal digital assistant, and a laptop computer.

9. The system as in claim 6, wherein the coupler includes a plurality of oppositely-disposed walls.

10. A display unit, comprising:

a housing defining an ambient light window and a viewing window;

a data display positioned inside the housing; and optics for guiding light from the ambient light window through the data display and out the viewing window, wherein the data display is illuminated by the light for viewing through the viewing window;

wherein the housing is at least one of slidably and rotatably coupled to an article of headwear for movement between first and second positions relative to the article of headwear;

wherein the data display is viewable through the viewing window when the housing is at the first position; and wherein the data display is not viewable through the viewing window when the housing is at the second position.

11. The display unit as in claim 10, further comprising:

a power source in electrical communication with the data display; and an artificial light source positioned within the housing, the artificial light source in electrical communication with the power source and selectively activatable;

wherein light emitted from the artificial light source passes through the data display and out the viewing window.

12. The display unit as in claim 10, wherein:

the optics include a first reflective member adjacent the ambient light window and a second reflective member adjacent the viewing window;

the data display being positioned between the first and second reflective members.

13. The display unit as in claim 12, further comprising a lens positioned between the data display and the viewing window for focusing or collimating light passing therethrough.

14. The display unit as in claim 12, wherein the first reflective member has a shape selected from the group consisting of flat, curved, spherical, and aspheric.

15. The display unit as in claim 14, wherein the second reflective member has a shape selected from the group consisting of flat, curved, spherical, and aspheric.

16. The display unit as in claim 10, further comprising a lens adjacent the viewing window for focusing or collimating light.

17. The display unit as in claim 10, wherein the data display is an LCD display.

18. The display unit as in claim 10, wherein the data display is an alphanumeric display.

19. The display unit as in claim 10, wherein the data display selectively defines indicia selected from the group consisting of letters, numbers, icons, arrows, enunciators, graphs, and charts.

20. The display unit as in claim 10, further comprising a microcontroller in electrical communication with the data display for controlling an output of the data display.

21. The display unit as in claim 10, wherein the viewing window includes a lens for focusing or collimating light.

22. The display unit of claim 10, wherein:

the article of headwear has a curved configuration;

the housing has a side adjacent the article of headwear;

the side has a curved configuration complementary to the curved configuration of the article of headwear; and the housing side remains adjacent the headwear when the housing moves between the first and second positions.

23. The display unit of claim 22, further comprising:

a microcontroller in electrical communication with the data display for controlling an output of the data display; and a receiver in electrical communication with the microcontroller for receiving signals broadcast from a remote position and for communicating the signals to the microcontroller.

24. The display unit of claim 23, wherein the housing is removably coupled to the article of headwear.

* * * * *